(12) United States Patent
Schlanger (10) Patent No.: US 10,847,835 B2
(45) Date of Patent: Nov. 24, 2020

(54) BATTERY MANAGEMENT SYSTEM FOR BATTERY BANKS WITH A SMALL NUMBER OF CELLS

(71) Applicant: William Jeffrey Schlanger, Palm Springs, CA (US)

(72) Inventor: William Jeffrey Schlanger, Palm Springs, CA (US)

(*) Notice: Subject to any disclaimer, the term of this patent is extended or adjusted under 35 U.S.C. 154(b) by 259 days.

(21) Appl. No.: 15/841,288

(22) Filed: Dec. 13, 2017

(65) Prior Publication Data
US 2019/0181490 A1    Jun. 13, 2019

(51) Int. Cl.
H01M 10/0525    (2010.01)
H02J 7/00    (2006.01)
H01M 10/44    (2006.01)

(52) U.S. Cl.
CPC ....... *H01M 10/0525* (2013.01); *H01M 10/44* (2013.01); *H02J 7/0016* (2013.01); *H02J 7/0021* (2013.01)

(58) Field of Classification Search
CPC .. H01M 10/0525; H01M 10/44; H02J 7/0021; H02J 7/0016; H02J 7/00
See application file for complete search history.

(56) References Cited

U.S. PATENT DOCUMENTS

| | | | |
|---|---|---|---|
| 6,018,229 A * | 1/2000 | Mitchell | G06F 1/26 320/112 |
| 6,406,806 B1 | 6/2002 | Keshula et al. | |
| 6,621,247 B1 * | 9/2003 | Bulling | G01R 31/396 320/116 |
| 7,932,702 B1 | 4/2011 | Patino et al. | |
| 8,219,333 B2 | 7/2012 | Li | |
| 8,258,747 B2 | 9/2012 | Andres et al. | |
| 8,350,519 B2 | 1/2013 | Brantner et al. | |
| 8,350,529 B2 | 1/2013 | Loncarevic | |
| 8,872,474 B2 | 10/2014 | Scheucher | |
| 9,436,261 B2 * | 9/2016 | Yun | H01M 10/425 |
| 2004/0249534 A1 | 12/2004 | Yamada et al. | |
| 2005/0057219 A1 * | 3/2005 | Kaminski | G01R 31/396 320/116 |
| 2007/0176604 A1 | 8/2007 | Morimoto | |
| 2008/0174269 A1 * | 7/2008 | DeRome | H02J 7/0045 320/110 |

(Continued)

*Primary Examiner* — Drew A Dunn
*Assistant Examiner* — Sailesh Thapa
(74) *Attorney, Agent, or Firm* — Invention To Patent Services; Alex Hobson (57) ABSTRACT

A battery management system monitors and controls the state of charge of a plurality of battery cells with a single data transceiver line. A sense board coupled to each cell monitors the battery cell voltage and temperature and reports the cell voltage in series, according to the location in series. A data request signal is sent by the control device of the battery management system through the single data transceiver line to initiate battery cell data transmission. The first battery cell in the series sends the first battery data upon receiving the data request signal and each subsequent battery cell in the series sends their respective battery data after a predetermined delay time set by two quaternary bits formed by a pair of voltage dividers. The state of charge may be displayed in real time on a graphical or numerical display.

13 Claims, 5 Drawing Sheets

(56) References Cited

U.S. PATENT DOCUMENTS

| | | | |
|---|---|---|---|
| 2011/0140650 A1* | 6/2011 | Zhang | H02J 7/0016 |
| | | | 320/103 |
| 2011/0234231 A1 | 9/2011 | Liu et al. | |
| 2011/0279087 A1 | 11/2011 | Andres et al. | |
| 2012/0116628 A1 | 5/2012 | Clark et al. | |
| 2012/0319658 A1 | 12/2012 | White et al. | |
| 2014/0312848 A1 | 10/2014 | Alexander et al. | |
| 2014/0365792 A1* | 12/2014 | Yun | G06F 1/3212 |
| | | | 713/320 |
| 2015/0191162 A1* | 7/2015 | Dao | H04Q 9/00 |
| | | | 701/22 |
| 2016/0285286 A1* | 9/2016 | Kudo | H02J 7/0021 |
| 2018/0056805 A1* | 3/2018 | Shen | B60L 58/12 |

\* cited by examiner

BATTERY MANAGEMENT SYSTEM FOR BATTERY BANKS WITH A SMALL NUMBER OF CELLS

BACKGROUND OF THE INVENTION

Background

Lithium batteries are finding many new applications that were not previously possible with lead acid batteries because they have long life, smaller size and weigh less. In addition, the lithium batteries are quite robust as long as they are not over charged or over discharged. Management of the cell voltage is critical to avoid damage. Typical battery management systems employ a monitoring and control device for regulating the amount of charge and discharge of the batteries based on a state of charge of each of the batteries in a battery pack. Each of the batteries in the battery pack has a communication line extending from the battery to a monitoring and control device. This makes wiring complicated as each cell communication line has to be input to the monitoring and control device in specific locations.

SUMMARY OF THE INVENTION

The invention is directed to a battery management system that monitors and controls the state of charge of a plurality of battery cells with a single data transceiver line. A plurality of battery cells are connected in series and a sense board coupled to each cell monitors the battery cell voltage and temperature and reports the cell voltage in series, according to the location in series. A data request signal is sent by the control device of the battery management system through the single data transceiver line to initiate battery cell data transmission from the plurality of battery cells. The first battery cell in the series sends the first battery data upon receiving the data request signal and each subsequent battery cell in the series sends their respective battery data after a predetermined delay time. In an exemplary embodiment, the delay times are set by two quaternary bits formed by a pair of voltage dividers configured between the plurality of battery cells and the data transceiver port. Each of the voltage dividers comprises a resistor affixed to a printed circuit board and a resistor located in a jumper block, which are coupled thereto to create said voltage divider. In an exemplary embodiment, each of the pair of jumpers has four different resistor combinations providing a total of sixteen different combinations for identification of a battery cell by specific delay time, as shown in Table 1:

TABLE 1

| Delay Timing | | |
|---|---|---|
| Jumper 1 | Jumper 2 | Time |
| 0 | 0 | 20 |
| 0 | 0.6 | 40 |
| 0 | 1.2 | 60 |
| 0 | 2 | 80 |
| 0.6 | 0 | 100 |
| 0.6 | 0.6 | 120 |
| 0.6 | 1.2 | 140 |
| 0.6 | 2 | 160 |
| 1.2 | 0 | 180 |
| 1.2 | 0.6 | 200 |
| 1.2 | 1.2 | 220 |
| 1.2 | 2 | 240 |
| 2 | 0 | 260 |

TABLE 1-continued

| Delay Timing | | |
|---|---|---|
| Jumper 1 | Jumper 2 | Time |
| 2 | 0.6 | 280 |
| 2 | 1.2 | 300 |
| 2 | 2 | 320 |

The voltage and temperature data is transmitted over the single data line with amplitude of the voltage referenced to the positive terminal of each individual cell and the negative terminal of the first battery cell in the series of battery cells. In this way, a separate ground is not required to transmit data for each battery cell. In the sense board, a PNP transistor connects the battery cell positive terminal to the single data line and serial data is sent in digital form with an amplitude proportional to the position of the battery cell in series. The amplitude of the transmitted data signal may be represented by $n*3.3V$ where n is the position of the cell in the series.

The sense boards and sensors, including the temperature sensor, may be powered by the individual battery cells. The voltage produced by the battery cell varies as a function of state of charge and may be too high for these components. Therefore, a voltage regulator may be configured to reduce the voltage of the battery pack to an appropriate voltage for these components of the system, such as down to 2V.

An exemplary battery management system may comprise a battery balancing system comprising a constant current sink. The battery management system may monitor and control or balance the state of charge of each battery cell in the plurality of battery cells or the battery pack. After running a diagnostic check of the state of charge of each of the battery cells, as described herein, the battery management system may drain some charge from one or more of the battery cells if they are above an upper threshold limit, or if they have a battery voltage that is higher than the battery voltage of other battery cells. A drain voltage regulator may be configured with a resistor that is coupled to a ground to drain charge from a battery cell. The drain voltage regulator maintains a constant voltage to the drain resistor to provide a constant current drain of charge from a battery cell. A cell that is above an upper threshold limit for state of charge may be connected to the constant current drain to reduce the state of charge below the upper threshold limit. A battery cell that has a state of charge that is higher than a second battery cell, such as more than about 10% higher, or more than about 20% higher, or more than about 30% higher may be connected to the constant current drain to reduce the state of charge to be similar to that of the second battery cell. This balancing operation will prevent a battery cell from being overcharged during a charging cycle and will prevent a battery cell from being over discharged.

Each of the battery cell sense boards may have a diode that prevents current from flowing into the buffer from another battery cell. This diode protects the sense boards and sensors from damage from exposure to higher voltages than they are designed for.

An exemplary battery management system may comprise a state of charge indicator that displays a state of charge of the battery pack. An exemplary state of charge indicator may comprise a light or plurality of lights that are illuminated to indicate a relative state of charge. For example, a state of charge indicator may comprise six lights and illumination of all six indicates a full state of charge and illumination of only three of the lights indicates a state of charge of about 50%.

An exemplary battery management system monitors the lithium batteries for over charge and over discharge and will turn off the battery charger or load as appropriate. Unlike lead acid batteries, the terminal voltage of a lithium battery does not reflect the state of charge. To obtain this, the current flowing in and out of the battery must be integrated. The exemplary battery management system does this by measuring the current second by second going in and out of the battery. The state of charge is presented on a series of LEDs representing the percentage of charge or a display, such as a seven segment display, that gives a numerical representation of the state of charge.

The current is measured with a very low value resistor in series with the most positive terminal of the battery pack. The current flowing through the very low value resistor produces a voltage proportional to the current. This voltage is amplified by a differential amplifier, the output of which is presented to an input of the analog to digital converter contained in the microprocessor of the control device.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
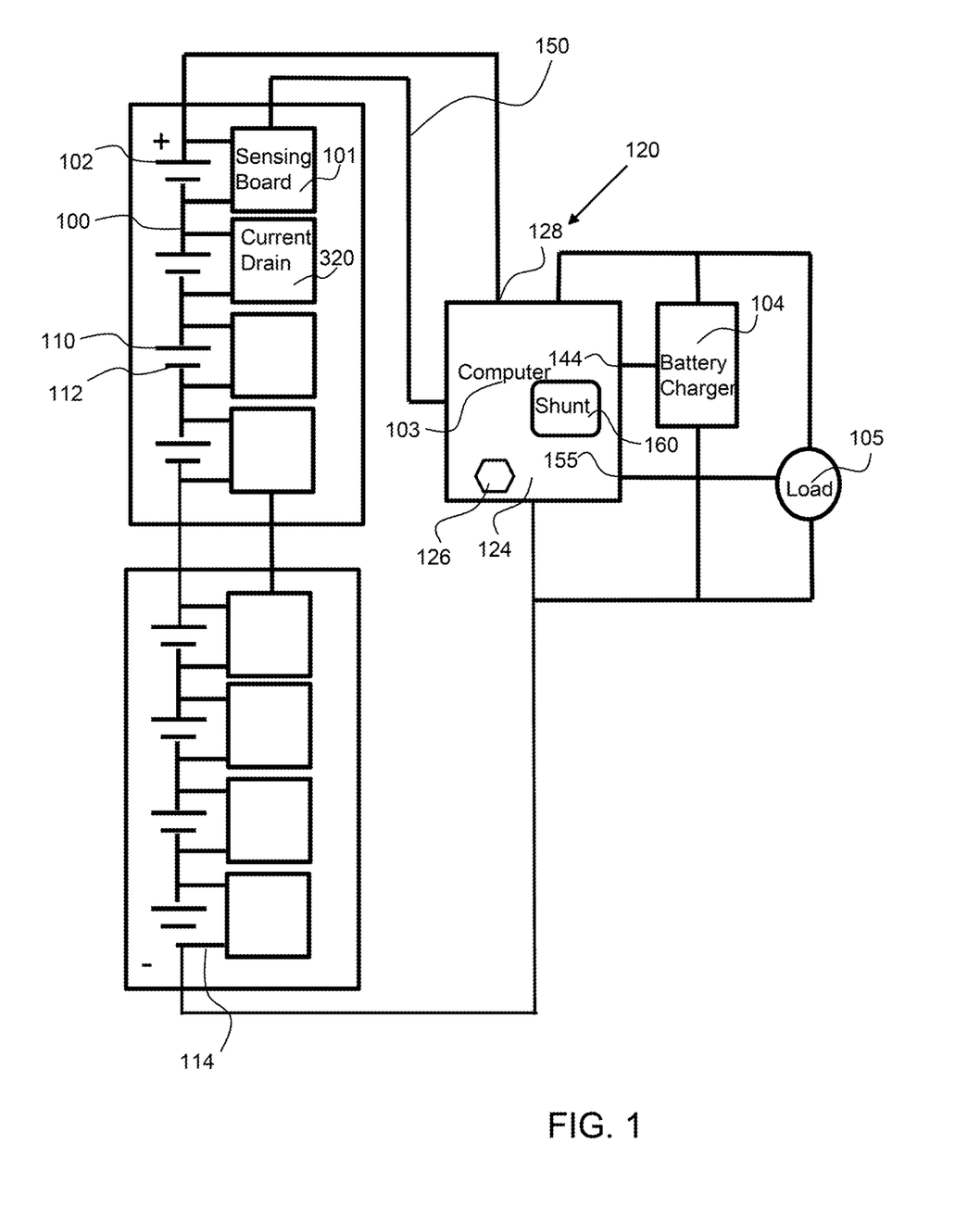
FIG. 1 shows a schematic for an exemplary battery management system having a plurality of battery cells each configured with a sense board and coupled to the control device by a single data transceiver line.

Referring to FIG. 1, the control device 124 of the battery management system 120 is coupled to a plurality of battery cells 102 that form a battery pack 100. The battery pack comprises eight battery cells configured in series. Typically, the battery cells are packaged in groups of four which are referred to in the industry as a 12V battery pack, although the cells produce about 3.3V normally, resulting in a battery voltage of 13.2V. Affixed to each battery cell 102 is a sense board 101 that monitors the respective battery cell voltage and temperature. A temperature sensor 320 located on the sense board is coupled to the battery cell to monitor battery cell temperature. The sense board contacts the positive terminal 110 and negative terminal 112 to measure the battery cell voltage. A single data transceiver line 150 transmits data from the sense boards to the battery management system control device 124 in response to an initiate signal from the control device. The data is transmitted in digital form and the control device may then initiate actions as a function of the input data. Transmitted data is received by the control device 124 of the battery management system 120 through the data input port 128. A control device 124 may comprise a microprocessor 128 for running programs to control functions of the battery management system. The charger output 144 is used to turn off the battery charger 104 if the battery pack is above a charge threshold state of charge. The load output 155 is used to turn off the load, or disconnect the battery pack from the load, when the battery pack is below a lower threshold state of charge. The current flowing out of the battery or into the battery is measured by a low value resistor (shunt) 160 in the computer, 103 and summed once per second. The resulting amp-seconds in the battery is divided by its capacity to determine the state of charge. The state of charge percentage can be displayed as a series of LEDs similar to a bar graph or with a display, such as a seven segment display, to present the state of charge in numeric form. The display can be turned off after a predetermined amount of time when there is no current flowing in or out of the battery to save power and not deplete the battery unnecessarily.

The control device determines when to turn off the load based on both the calculated state of charge as calculated by the measured current flow through the shunt and the individual battery cell voltages as received through the single data transmission line. If a cell voltage is below a lower threshold value, it is deemed discharged and the state of charge accumulator is set to zero. Similarly, the decision to turn off the battery charger is based on both the calculated state of charge calculated by the measured current flow in the shunt and the individual battery cell voltages as received through the single data transmission line. If any battery cell voltage is above an upper threshold limit, the battery pack is deemed charged and the charger is turned off.

Should the temperature of a cell become too high, the charger or load can be disconnected. Also, if the current flow in or out of the battery is too high, the load and battery charger can be turned off.

The battery charger will be allowed to charge the battery to 100% or a full state of charge, and then it will be turned off until the state of charge drops to a charge threshold state of charge, which may be about 50% or more of the full state of charge, about 60% or more of the full state of charge, or 70% or more of the full state of charge, less than about 75% of the full state of charge, and any range between and including the threshold states of charge provided. In this way, the charger will not oscillate on and off as is common in voltage based systems for turning the charger on and off.

Figure 2:
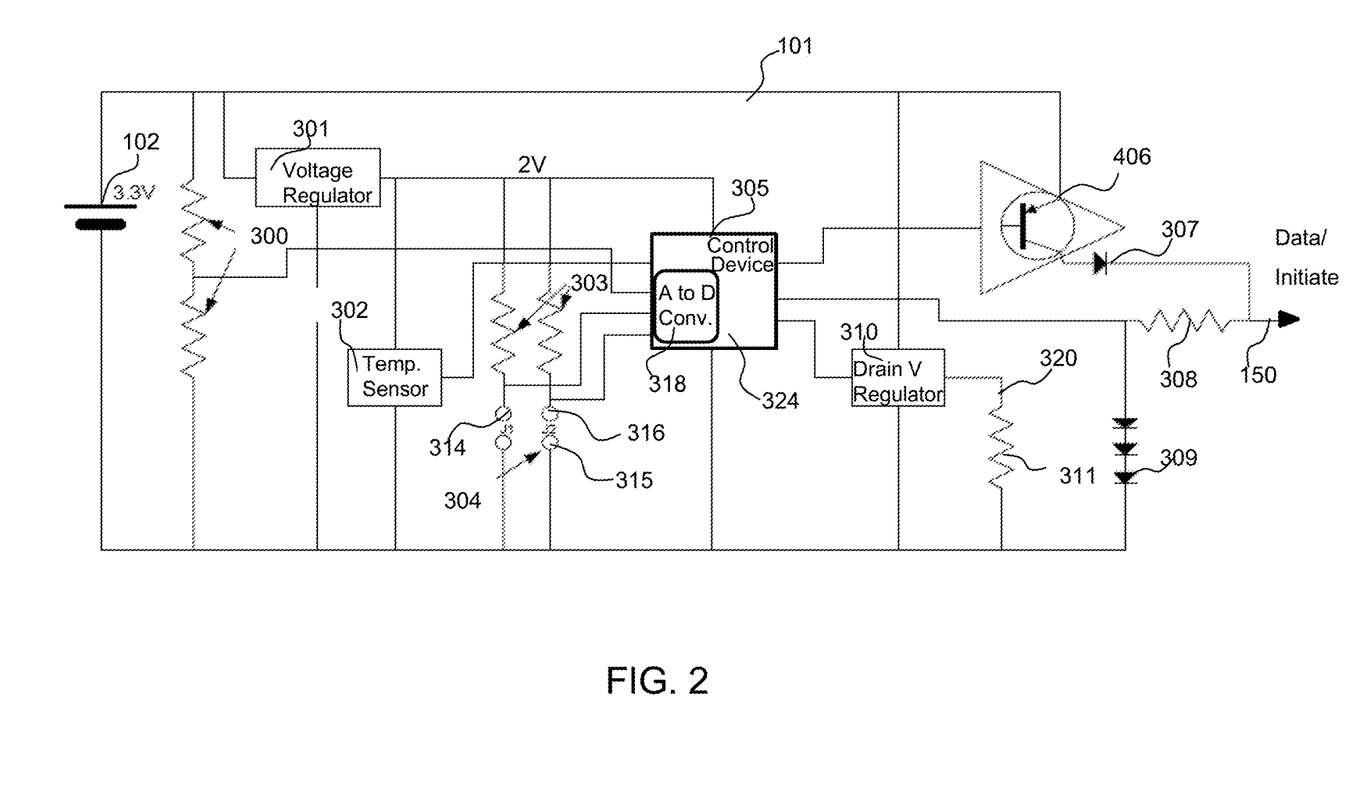
FIG. 2 shows a circuit diagram for an exemplary sense board.

As shown in FIG. 2, a sense board 101 is coupled to each of the battery cells and measures metrics of the battery cell 102 such as battery cell voltage and battery cell temperature. The power for the sense board is derived from the individual cell in the battery pack, typically 3.3V. This voltage varies under load and state of charge and is regulated down by the power voltage regulator 301 to 2V to provide stable power for the microprocessor, 305. The power voltage regulator 301 also provides stable power to the temperature sensor 302. The battery voltage is divided down with a voltage divider 300 to a level below 2V under all circumstances such as when the battery is charged to a full state of charge. The resulting battery cell voltage is sampled by the analog to digital converter 318. Similarly, the output of temperature sensor 302 is also sampled by the analog to digital converter.

During the charging cycle, cells in the battery pack may develop unequal charge. To balance the charge, a constant current sink 320, consisting of a drain voltage regulator 310 and a resistor 311, is used to provide a controlled discharge. If a constant voltage is applied across a resistor, a constant current will flow according to Ohm's law, I=V/R. Even though the input voltage to the regulator, the battery cell voltage, may vary, the resultant output voltage from the drain voltage regulator will not. The balancing function is controlled by the microprocessor 305 which will turn on at a pre-determined voltage and off at a pre-determined voltage.

Figure 3:
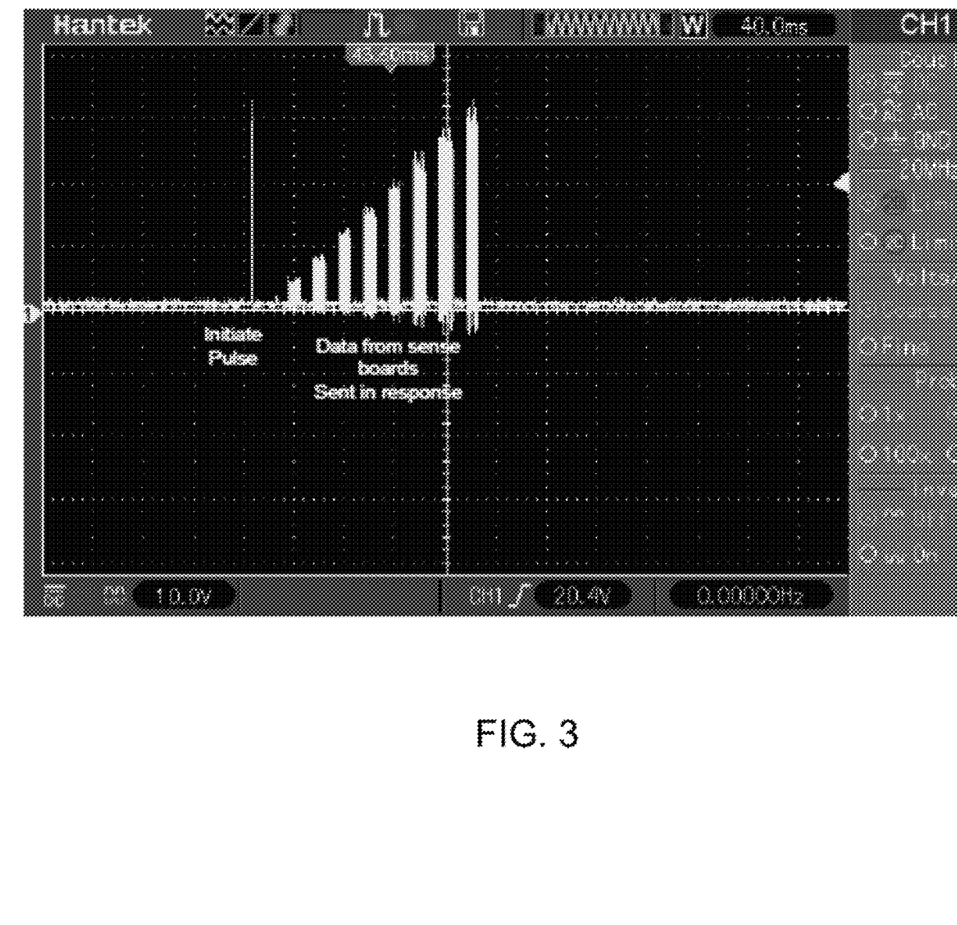
FIG. 3 shows an oscilloscope screen shot showing data transmission through the single data transceiver line from the plurality of battery cells.

Referring to FIG. 3, the data from the sense boards is initiated by a pulse on the data line by the computer. After a predetermined amount of time, each sense board responds with its reading of the battery cell voltage and temperature. The amplitude of the data sent from each sense board will vary according to where it is in a series string of cells. The screen of the oscilloscope shows the data from eight sense boards with increasing amplitude since they are arranged on a series string of eight cells as depicted in FIG. 1.

Referring again to FIG. 2, the PNP transistor of the data buffer 303 is connected to the + terminal of the battery it is measuring, so the amplitude of the data it responds with is n×3.3V, where n is the cell position in the series string. A diode 307 prevents current flowing into the buffer from any cells that may have higher voltage. The data from the sense boards is initiated by a pulse on the data line 150. This pulse has the full pack voltage in amplitude, in this case 24V. The pulse has to be limited to about 2V so as to not damage the input to the microprocessor. This is done by the current limiting resistor, 308, and the three forward biased diodes shown collectively as 309. Once the microprocessor 305 receives the initiation pulse, it waits for a period of time determined by two voltage dividers 304 fed into the analog to digital converter inputs of microprocessor 305. The time period when a sense board responds is determined by plugging in a resistor 314, 315, or omitting it, a voltage divider is formed. For this, no resistor applies 2 volts to the input and a short, 0 ohms, applies 0 volts to the input. Two other intermediate values of 0.6 and 1.2V can also be applied with the proper choice of resistors. Thus, with two pins 316 for plugging in a resistor, four different states can be made. With two sets of such pins, 16 distinct states can be made. Two quaternary, base four, digits make 16 states. Simply multiplying the resultant quaternary number by 20 milliseconds yields the delay as shown in Table 1.

Figure 4:
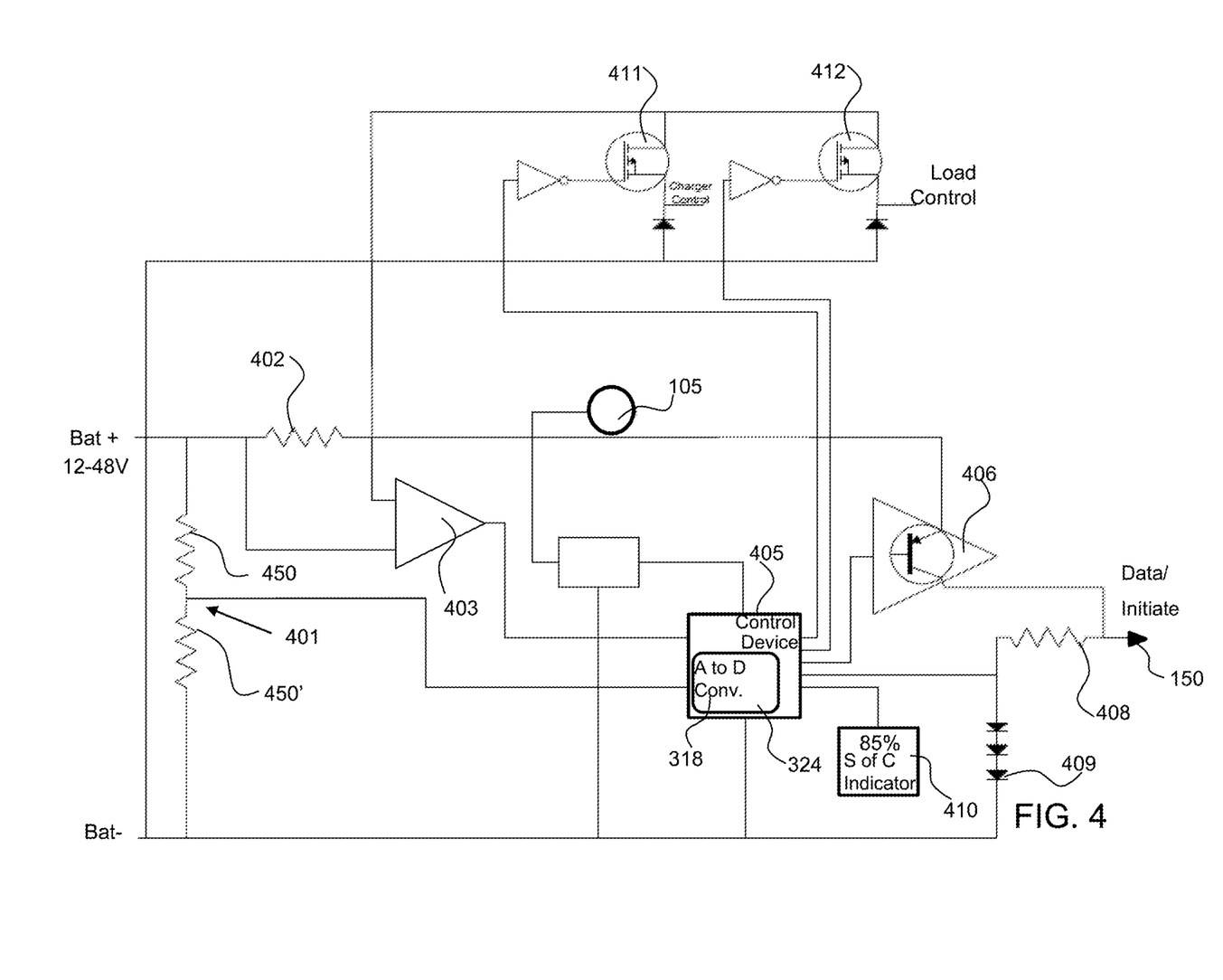
FIG. 4 shows a circuit diagram for an exemplary battery management system.

As shown in FIG. 4, the control device 324 and microprocessor 405 are powered by the full pack voltage. In the case of the example in FIG. 1, the full pack voltage is 24V, but it may be between from 12V to 48V, for example. The battery + passes through a shunt 402 inside the unit and the resulting voltage drop is amplified by the current amplifier, 403. The output of the current amplifier is fed into an analog to digital converter input on the microprocessor, 405. The microprocessor samples this voltage every second and calculates the state of charge as described above. This voltage can reflect both a current flow into the battery and out of the battery by going above or below 1.2V. That is, 1.2V represents a current of 0. The pack voltage is divided down by a resistive divider shown collectively as 401, having two resistors 450, 450', to a level so that the resulting voltage will not exceed the 5V power supply of the microprocessor. The microprocessor 405 sends the initiation pulse via a buffer 406 with a PNP transistor output. The initiation pulse is at the full pack voltage. Data coming from the sense boards may have varying amplitudes as described above and this signal is amplitude limited by the current limiting resistor 408 and the three forward biased diodes collectively labeled 409 to prevent damage to the microprocessor input. Based on the decision-making process outlined above, the load and battery charger may be turned on and off. These are controlled with the output MOSFETS 411 and 412. The resulting state of charge percentage can be displayed either as a series of individual LEDs as in a bar graph or as a number of numerical digits displayed by a display, such as seven segments of LEDs. These are shown as the state of charge indicator 410.

Figure 5:
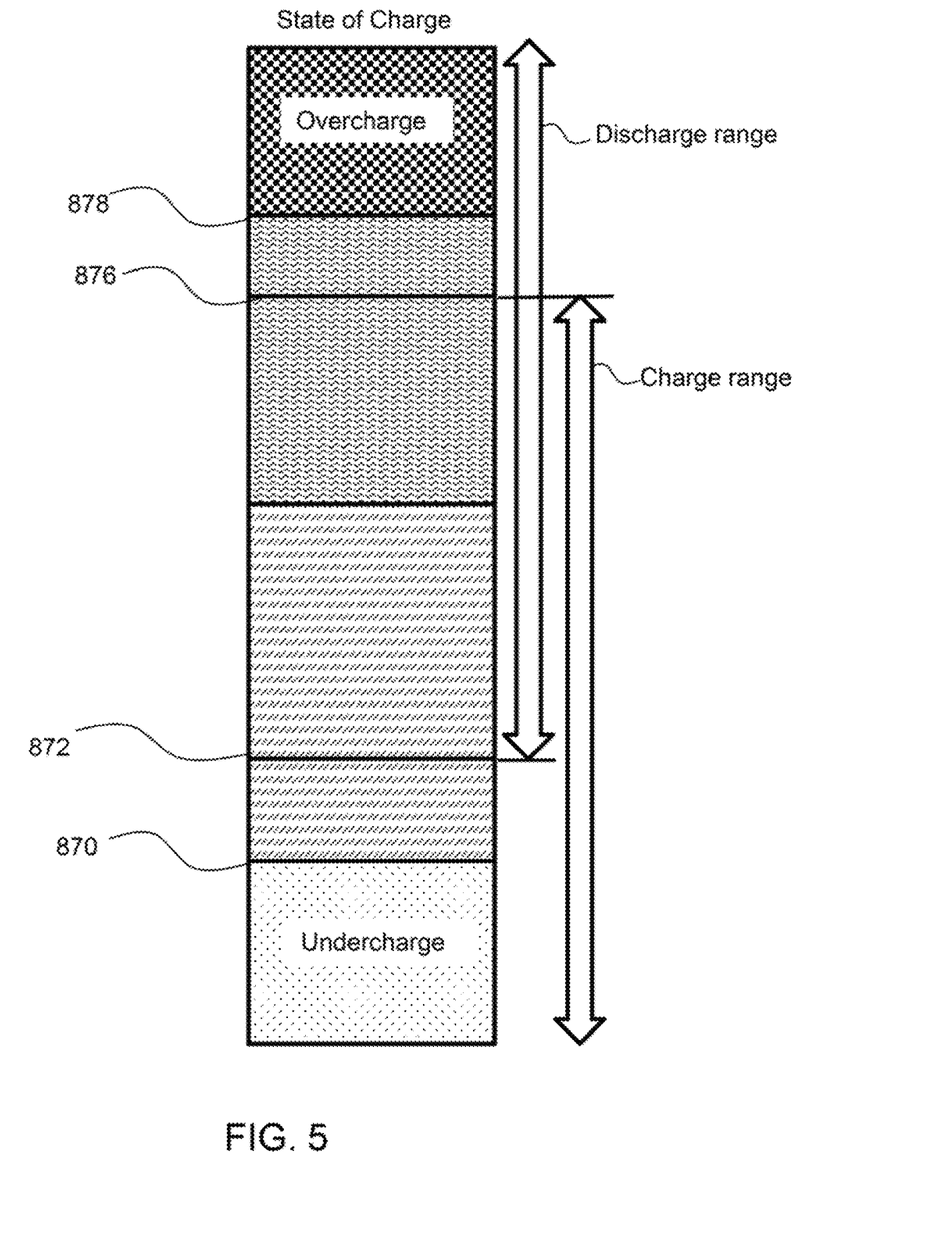
FIG. 5 shows the battery state of charge ranges for charging and discharging.

FIG. 5 shows the threshold limits for controlling discharge and charging of a battery cell or cell pack. The cell or pack may be discharged over the discharge range from an overcharged state of charge to a lower discharge threshold limit 872. The cell or pack may be charged over the charge range from an upper charge threshold 876, as discussed herein, to an undercharged state of charge. The cell or battery may have an undercharge threshold 870 and a full charge threshold 878, and it is desirable to keep the state of charge within this range. Equipment malfunction may result in a battery having a state of charge outside of this preferred range. As discussed, overcharging or over discharging can damage lithium ion batteries.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A battery management system comprising:
a) a single control device comprising:

i) a microprocessor;
ii) a data transceiver port;
iii) a shunt;
b) a battery bank comprising:
i) a plurality of battery cells configured in series comprising a first battery cell and a last battery cell in the series, and wherein each of the plurality of battery cells comprises:
a positive terminal;
a negative terminal;
a battery cell voltage; and
a sense board connected to the positive terminal and said negative terminal, said sense board comprising:
a microprocessor for sending battery data;
a voltage regulator that regulates the battery cell voltage down to 2V for the microprocessor power supply voltage level;
a PNP transistor that is connected to the positive terminal and the data transceiver port; and
wherein the PNP transistor sends battery cell voltage as a data voltage corresponding to the battery cell position in the series of batteries;
a diode configured between the PNP transistor and the data transceiver port of the control device that prevents current from flowing into the buffer from another battery cell having higher voltage from the plurality of battery cell;
c) a single data transceiver line connecting the data transceiver port with the sense board of each of the plurality of battery cells;
wherein the control device receives battery data comprising battery voltage and battery temperature from the single data transceiver line;
wherein a data request signal is sent by the control device through the single data transceiver line to initiate battery cell data transmission from said plurality of battery cells to the control device;
wherein each of the sense boards sends battery data including battery cell voltage about each respective battery cells through the single transceiver line;
wherein a second battery cell sends second battery data including second battery cell voltage after a delay time from the data request signal;
wherein the sense board data transmission delay time is progressively longer for each of the batteries from the second to the last battery cell;
wherein the control device identifies which sense board is sending the battery data by the delay time wherein there is an incremental increase in delay between receiving data from each of the plurality of battery cells; and
wherein a state of charge is measured from the positive terminal of each of said plurality of battery cells and a most negative terminal;
wherein the shunt measures the current from the plurality of battery cells;
wherein the battery management system does not have individual control devices coupled to each of the plurality of battery cells; and
wherein the most negative terminal is a negative terminal of the first battery cell.

2. The battery management system of claim 1, wherein each of the plurality of battery cells comprise a temperature sensor coupled to the sense board for measuring said battery temperature for each of the plurality of battery cells.

3. The battery management system of claim 2, wherein the sense board comprises an analog to digital converter that converts the measured battery temperature to a digital data form for transmission through the single data transceiver line.

4. The battery management system of claim 2, wherein each of the temperature sensors are powered by the battery cell it is coupled to and wherein the voltage regulator regulates the battery cell voltage down to a temperature sensor voltage level to power the temperature sensor.

5. The battery management system of claim 1, wherein the delay time is set by two quaternary bits formed by a pair of voltage dividers, wherein each of the voltage dividers comprises a pair of jumpers and wherein each of the jumpers has one or more resistors coupled thereto to create said voltage divider.

6. The battery management system of claim 5, wherein each of said pair of jumpers has four different resistor combinations providing a total of sixteen different combinations for identification of a battery cell from the plurality of battery cells.

7. The battery management system of claim 1, wherein the sense board comprises an analog to digital converter for converting a measured battery cell voltage to digital for transmission through the single data transceiver line.

8. The battery management system of claim 1, further comprising a battery balancing system comprising a constant current sink comprising:
a) a balancing voltage regulator;
b) a balancing resistor;
wherein the balancing voltage regulator maintains a constant voltage to across the balancing resistor; and
wherein a battery cell from the plurality of battery cells is coupled with the constant current sink to reduce a state of charge.

9. The battery management system of claim 8, wherein said battery cell is coupled with the constant current sink when said battery cell has a state of charge that is above an upper threshold state of charge.

10. The battery management system of claim 8, wherein said battery cell is coupled with the constant current sink when said battery cell has a state of charge that is above a second battery cell of the plurality of battery cells by 10% or more.

11. The battery management system of claim 1, wherein a resistor is configured between the PNP transistor and the data transceiver port of the control device.

12. The battery management system of claim 1, further comprising a battery state of charge indicator.

13. The battery management system of claim 12, wherein the battery state of charge indicator comprises a series of lights or a seven segment numeric display.

* * * * *